United States Patent [19]

Smolik

[11] Patent Number: 4,800,190

[45] Date of Patent: Jan. 24, 1989

[54] FILTER MATERIAL AND PROCESS FOR THE PRODUCTION THEREOF

[75] Inventor: Klaus Smolik, Gefrees, Fed. Rep. of Germany

[73] Assignee: Helsa-Werke Helmut Sandler GmbH & Co. KG, Gefrees, Fed. Rep. of Germany

[21] Appl. No.: 95,820

[22] Filed: Sep. 11, 1987

[30] Foreign Application Priority Data

Jun. 11, 1987 [DE] Fed. Rep. of Germany ....... 3719418

[51] Int. Cl.$^4$ .............................................. B01J 20/02
[52] U.S. Cl. .................................... 502/416; 502/400; 502/527; 502/402; 55/316; 55/387; 55/524
[58] Field of Search ............... 502/402, 416, 400, 527; 55/316, 387, 524; 210/502.1

[56] References Cited

U.S. PATENT DOCUMENTS 4,664,683  5/1987  Degen et al. .......................... 55/524

FOREIGN PATENT DOCUMENTS 2804154  1/1979  Fed. Rep. of Germany .
4744153  11/1972  Japan ................................... 502/402

Primary Examiner—Deborah Yee
Attorney, Agent, or Firm—Hoffman & Baron

[57] ABSTRACT

In a process for the production of a filter material comprising an open-pore foam carrier carrying adsorber particles of different particle sizes secured thereto, an adhesive is applied to the foam carrier material and then first adsorber particles are applied to the foam carrier material and into the open pores thereof. When the adhesive is still in a non-set condition, second adsorber particles which are of substantially smaller size than the first adsorber particles are then applied to the foam carrier material and into the open pores thereof.

13 Claims, 1 Drawing Sheet

U.S. Patent     Jan. 24, 1989     4,800,190
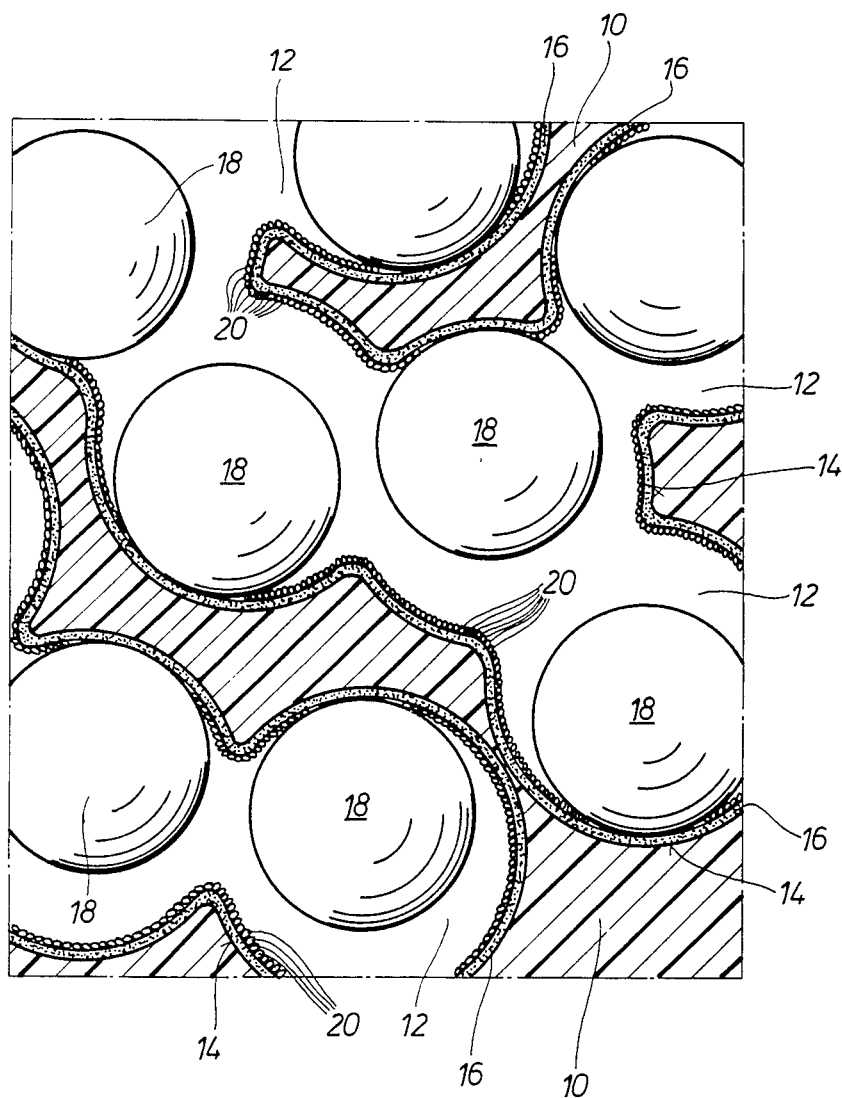

FILTER MATERIAL AND PROCESS FOR THE PRODUCTION THEREOF

BACKGROUND OF THE INVENTION

The present invention relates generally to a process for the production of a filter material and more particularly a filter material comprising an open-pore foam carrier with adsorber particles of different sizes fixed thereon.

One form of process for producing a filter material comprising an open-pore foam carrier with adsorber particles fixed thereto, as disclosed in German published specification (DE-AS) No 28 04 154, provides that the foam carrier material and the surface of the pores thereof are provided in a first operation with adsorber particles which are very small in comparison with the mean pore diameter of the foam carrier. Porous adsorber particles are then additionally introduced into the pores of the foam carrier. Those porous particles are relatively large, in comparison with the adsorber particles first applied to the foam carrier. The operation of introducing the porous adsorber particles, in the form of grains which substantially fill the pores in the foam carrier, is effected by the adsorber particles or grains being shot into the foam carrier by means of a directed air flow. It can be considered therefore that the relatively large porous adsorber particles are fixed in the pores primarily by a form of mechanical clamping or retaining effect. However, fixing the relatively large and porous adsorber particles in that way suffers from various difficulties. For that reason the above-quoted publication also states that it would be possible for the foam carrier with the relatively large adsorber particles embraced therein subsequently to be impregnated with a weak solvent which results in the wall surfaces of the pores in the foam being softened so that the adsorber particles or grains which are applied thereto are caused to adhere to the wall surfaces of the pores. The relatively larger grains may be also be secured by a heat fixing operation. However, irrespective of the way in which the relatively large adsorber particles or grains are fixed in the pores in the foam carrier, that process always provides that the pore surfaces are firstly at least partially covered with the first and relatively small adsorber particles, whereafter the relatively large and porous adsorber particles are introduced into the open pores. If however the first smaller adsorber particles do not completely cover the surfaces of the pores, the the adsorption qualities of the resulting filter material still leaves something to be desired. If on the other hand the first smaller adsorber particles completely cover the surfaces of the pores, then although the filter material which is produced in that way may have good adsorption properties, the second larger adsorber particles are disposed on the first and previously deposited smaller adsorber particles over at least a certain area of contact therebetween, so that that part of each of the first smaller adsorber particles is unable to take an active part in the adsorption process. Furthermore it often transpires that the larger adsorber particles are not satisfactorily fixed to the smaller adsorber particles on the foam carrier material.

SUMMARY OF THE INVENTION

An object of the present invention is to provide a process for the production of a filter material having adsorber particles, which provides for more effective distribution and arrangement of the adsorber particles.

Another object of the invention is to provide a process for the production of a filter material comprising a foam carrier with adsorber particles of different sizes fixed thereon, wherein smaller adsorber particles are not masked in a region-wise manner by larger adsorber particles.

Still a further object of the invention is to provide a process for producing a filter material having adsorber particles of different sizes wherein the large adsorber particles are secured to the foam carrier thereof as securely as the smaller adsorber particles.

Still a further object of the invention is to produce a filter material consisting of an open-pore foam carrier with adsorber particles consisting of particles of at least first and second sizes, which provides for satisfactory fixing of said particles to said foam carrier material.

In accordance with the present invention, those and other objects are achieved by a process for the production of a filter material comprising an open-pore foam carrier having adsorber particles of different sizes fixed on the foam carrier and in the open pores thereof. The process comprises first applying a layer of adhesive to the foam carrier material, whereupon first adsorber particles are applied to the foam carrier and into the open pores thereof. When the adhesive has not yet set, second adsorber particles of substantially smaller size than the first adsorber particles are applied to the foam carrier and into the open pores thereof.

The process according to the invention, in contrast to the previous process described above, therefore does not provide that the small adsorber particles are first applied to the foam carrier, followed then by the large adsorber particles, but firstly the larger adsorber particles and then the smaller adsorber particles are applied to the foam carrier material. In that way the smaller adsorber particles only cover the surface portions of the open pores in the foam carrier, which remain beside the areas of contact between the pore surfaces and the first and larger adsorber particles. That mode of operation provides for a saving of material in respect of the second smaller adsorber particles, without the adsorption qualities of the filter material produced by the process according to the invention being adversely affected.

A considerable advantage is also that the filter material produced in accordance with the invention provides that the first large adsorber particles are mechanically firmly and securely fixed on the foam carrier and in the open pores thereof. As the first large adsorber particles and the second smaller adsorber particles are fixed to the adhesive layer covering the pore surfaces, in direct succession, the connection between the smaller adsorber particles and the pore surfaces is just as good as the connection between the larger adsorber particles and the pore surfaces. That ensures that the filter material produced by the process of the invention enjoys good resistance to abrasion in respect of the particles which are fixed to the foam carrier material.

In a preferred feature of the process in accordance with the present invention, the process uses first adsorber particles which are of a particle or grain size which is between 0.1 and 0.9 times the mean pore diameter of the foam carrier, and the second adsorber particles which are then applied to the foam carrier and introduced into the open pores thereof are preferably in a powder form or are of a spherical shape with a diameter of between 0.05 and 1 $\mu$m. The first adsorber particles may also be of a spherical shape, of a diameter of between 0.1 and 0.9 mm. An optimum relationship in respect of adsorber contact to adsorption kinetics is achieved when using first adsorber praticles which are of a diameter of about 0.4 mm. The first adsorber particles preferably comprise activated carbon whose internal surface area is between about 600 and about 1400 $m^2/g$ and which has a high proportion of mesopores. The second smaller adsorber particles preferably comprise a highly active powdered carbon having an internal surface area 1000 $m^2/g$, with a high proportion of macropores. The first larger adsorber particles have a high storage capacity without substantially increasing the resistance to flow through the filter material. The first larger adsorber particles, preferably in the form of spheroidal carbon, may include impregnation means for dealing with noxious substances such as $NOx$, $SO_2$ or toxic gases. Such impregnation also provides for chemical bonding or catalytic decomposition of the noxious substances, in addition to the purely physical adsorption effect.

On the other hand, such impregnation of the first larger adsorber particles does not cause any serious restriction in the adsorption of the filter material. In order to influence the relationship of physisorption and chemisorption in a filter material of that nature it is also possible for impregnated first larer adsorber particles to be suitably mixed in a very wide range of ratios with nonimpregnated first larger adsorber particles.

The second adsorber particles which are preferably in powder form and which cover the pore surfaces which remain beside the first larger adsorber particles produce a large chemically active filter surface. That means that the gaseous noxious substances which are to be adsorbed have a long residence or contact time, in relation to the second smaller adsorber particles. Accordingly the second adsorber particles serve as intermediate storage means for receiving noxious substances and/or odorous substances. The second smaller adsorber particles, preferably in the form of powder activated carbon, can provide that variation in the level of concentration of polluting substances in the air to be filtered can be absorbed or cushioned and suppressed below the threshold in respect of toxic effect or odour.

The foam carrier is preferably impregnated with the adhesive and then the impregnated foam carrier is squeezed out, to remove excessive adhesive. The first larger adsorber particles are then introduced into the open pores of or applied to the foam carrier, followed then by the application of the second smaller adsorber particles. That mode of operation makes it possible to impregnate the open-pore foam carrier, with the adhesive covering the surfaces of the pores of the foam carrier in the form of a layer of a defined thickness. The first larger adsorber particles are then secured to the layer of adhesive, in a first working operation, followed then by the second smaller adsorber particles in a second working operation which takes place immediately after the first working operation. The layer of adhesive on the surface of the foam carrier and the surfaces of the pores therein may be applied by spraying, foularding, a kind of sizing-like process, a padding-type process or by roller application. The level of hardness of the foam carrier and the hardness of the filter material produced therefrom in accordance with the invention can be set at a suitable value by virtue of impregnation of the open-pore foam carrier which may preferably be a polyurethane foam. Suitable adjustment of the level of hardness of the foam carrier makes it possible on the one hand to prevent or at least reduce deformation thereof, while on the other hand it substantially enhances the adhesion of the first larger adsorber particles.

The operation of applying the first and second adsorber particles to the foam carrier and the introduction thereof into the pores of the foam carrier can be performed by the first and second adsorber praticles being respectively dropped on to the adhesive-impregnated foam carrier, from given heights. The first and second adsorber particles may also be applied to the foam carrier by those particles on the one hand and the foam carrier on the other hand being oppositely electrostatically charged during the operation of applying the adsorber particles and introducing them into the pores. The foam carrier may be coated with the first larger adsorber particles by the foam carrier being passed through a bath in which the first larger adsorber particles are disposed. The first larger adsorber particles are joined to the pore surface of the foam carrier only over a small area of their surface, of the order of magnitude of 4%. That ensures that the fixing operation, that is to say the operation of applying the particles to the foam material and into the pore structure thereof, produces virtually no limitation in regard to the active free or exposed surface of the first adsorber particles. On the other hand however the first larger adsorber particles are very securely and mechanically firmly fixed to the open-pore carrier material and in the pores thereof, by virtue of that procedure. The carrier material and the open pores thereof may also be coated with the adsorber particles by the particles being blown onto the carrier material or by being flung thereagainst in a defined fashion, besides being sprinkled on to or strewn over the carrier material under suitable conditions in respect of electrostatic charge.

In a preferred feature of the invention, a reduced pressure can be applied to the side of the foam carrier which is in opposite relationship to the source of adsorber particles, during the operation of introducing the first and second adsorber particles. That reduced pressure improves transportation of the adsorber particles into the carrier material and through same so as to permit even more uniform distribution of the particles in the interior of the open-pore structure of the foam carrier. The application of a reduced pressure at the side of the foam carrier which is in opposite relationship to the source of adsorber particles is particularly advantageous during the operation of introducing the second smaller adsorber particles, in order to be able to recover any excess adsorber particle material. For that purpose it may be advantageous for the excess first and second adsorber particles which are not retained in the foam carrier to be returned to the respective corresponding adsorber particle sources after those particles have been subjected to suitable processing to remove any adhesive material clinging thereto.

After the first and second adsorber particles have been introduced, a drying process is preferably carried out, with the filter material passing through a drying apparatus at tempeatures of around 150° C. A final cleaning operation is then effected, in which first and/or second adsorber particles which are not fixed on the foam carrier or in the pores thereof can be removed by being sucked off the foam carrier.

The open-pore foam carrier may be a polyurethane foam with a pore-size of 15 pores per inch to 100 pores per inch. That corresponds to a mean pore diameter in the range of from 1.0 mm to 1.7 mm. The above-described impregnation of the foam carrier makes it possible at least partially to compensate for and even out fluctuations in the weight per unit area of the foam carrier material, without such impregnation adversely affecting air premeability of the material, that is to say, without increasing the resistance to flow through the material. By suitably selecting the pore size and the distribution of given pore sizes in the open-pore foam carrier it is possible to influence the applied amounts of adsorber particles, that is to say the proportions as between the first larger adsorber particles and the second smaller adsorber particles, and thereby also influence parameters of the filter material such as permeability in regard to air, contact time in respect of the noxious or odorous substances with the adsorber particles, and the filter capacity.

The following adhesive materials may be used for impregnation of the open-pore foam carrier: modified acrylates, polyurethanes, silicone rubber, polyvinylidene, polyvinyl chloride, polyamide and polyester granules and powders.

The filter material produced in accordance with the process of the invention has a high level of adsorption kinetics, an optimum degree of adsorber utilisation, a high level of efficiency in relation to odorous and noxious substances due to the large surface area of the adsorber particles employed, controllable flow resistance by virtue of a suitable choice of the mean pore size or range of distribution of the mean pore size of the foam carrier, a high level of insensitivity in relation to moisture and humidity, a long contact time as between the substances to be filtered and the adsorber particles, a low pressure drop through the filter material, which is a corollary of a high level of air permeability, and a high level of insensitivity in relation to changes in pressure and vibration. Vibration acting on the filter material produced by the process according to the invention does not result in the formation of passages or ducts through the material, as the filter material has a virtually self-sealing action. The filter material also has a high level of resistance to abrasion which means that there is no need to provide particle filters downstream thereof. There is likewise little danger of inoperative dead zones occurring in the filter material. The filter material may be of a self-supporting nature so that it eliminates a pressure drop which would otherwise be caused by holding or mounting means. the filter material produced by the process according to the invention can be easily adapted to any installation conditions and takes up a small amount of space. The materials used in the filter material are harmless from the physiological point of view. The filter material which is preferably of a neutral smell has a low level of sensitivity to moisture, so that the filter material has a long service life. Its range of use in respect of temperature is between −30° C. and +100° C.

If the filter material produced by the process in accordance with this invention is subjected to a thermal ageing operation, it is noted that there are no changes in adsorber adhesion, mechanical properties such as tearing strength and stretching and adsorption performance, the odor-removing efficiency is not influenced to a measurable degree, there is no permanent change in weight and there is no measurable change in compression hardness. The filter material is even more resistant to abrasion and attrition of the adsorber particles, at higher temperatures.

The filter material may be used in relation to the filtration of feed air in vehicles, for the purposes of space or room air cleaning, in relation to breathing protective masks or in relation to protective clothing in the civil or millitary spheres. In the case of the filtration of feed air for vehicles, the filter material serves to remove polluting or health-endangering constituents in the outside air before it passes into the passenger compartment. Such constituents may be $SO_2$, $NO_x$ or hydrocarbons.

Further objects, features and advantages of the invention will be apparent from the following description of a preferred embodiment.

BRIEF DESCRIPTION OF THE DRAWING

The drawing is a diagrammatic view on a greatly enlarged scale of an embodiment of a filter material produced by the process in accordance with this invention.

DESCRIPTION OF THE PREFERRED EMBODIMENT

Referring to the drawing, shown therein is a section from a foam carrier 10 which is illustrated on a greatly enlarged scale and which is an open-pore polyurethane foam. Reference numeral 12 in the drawing indicates the pores of the foam carrier 10, which are linked or communicating with each other and with the outside surface (not shown) of the foam carrier 10.

In carrying out the process of the invention, the surface 14 of the pores 12 is coated with a layer of adhesive 16 which is produced therein by impregnating the foam carrier 10. After the layer of adhesive 16 has been formed on the walls of the pores 12, first adsorber particles 18 are applied to the foam carrier 10 and introduced into the open pores 12 therein. Second adsorber particles 20 are directly thereafter applied to the foam carrier 10 and introduced into the open pores 12 therein. The second adsorber particles 20 are of substantially smaller grain size than the first adsorber particles 18.

The mean diameters of the pores 12 may be for example between 0.25 mm and 1.7 mm, corresponding to a pore size or distribution of 15 pores per inch to 100 pores per inch. In the case of a foam carrier 10 of the last-mentioned kind, the first adsorber particles 18 may be of a diameter of around 0.4 mm while the second adsorber particles 20 are of a size which is less than 40 $\mu$m. It will be appreciated that the drawing does not show the particles in the correct size relationship with respect to each other, but is only intended to show that both the first adsorber particles 18 and also the second adsorber particles 20 are securely fixed to the foam carrier 10 by means of the adhesive coating 16. The drawing also shows that there are no second smaller adsorber particles 20 in regions in which the respective first larger adsorber particles 18 are fixed to the foam carrier 10 by the adhesive 16, that therefore resulting in a saving on the amount of second adsorber particles 20 used, without the filter effect of the filter material suffering as a result.

The drawing shows the region of contact between the adsorber particles 18 and the foam carrier 10, as being larer than it actually is.

As already described above, the contact region between the particles 18 and the foam carrier 10 is only about 4% of the surface area of the adsorber particles 18, by virtue of suitable choice in respect of the size of the particles 18 and the magnitude of the mean diameters of the pores 12.

In carrying out the process of the invention therefore, after the adhesive layer 16 has been applied to the foam carrier 10, the first adsorber particles 18 are applied to and introduced into the pores in the foam carrier, and the second adsorber particles are then similarly applied to and introduced into the pores in the foam carrier when the adhesive 16 has not yet set. The particle size of the first adsorber particles is preferably between 0.1 and 0.9 times the mean pore diameter of the pores of the foam carrier, with the second adsorber particles 20 being of a powder form as illustrated.

In order to provide sufficient adhesive 16 in the foam carrier material, without however wasting adhesive material, the foam carrier may be impregnated with the adhesive and then squeezed out to remove excessive adhesive. The first and second adsorber particles 18 and 20 are then applied to the foam carrier in the above-indicated manner.

It will be appreciated that the process in accordance with the invention has been described hereinbefore solely by way of example and illustration thereof and that various modification may be made therein without thereby departing from the spirit and scope of the invention.

What is claimed is:

1. A process for the production of a filter material comprising providing a self-supporting open-pore foam carrier and first and second adsorber particles of different sizes to be carried by the foam carrier, providing the foam carrier with an adhesive layer, introducing first adsorber particles into the open pores of the foam carrier, and then introducing second adsorber particles of a substantially smaller particle size than the first adsorber particles into the open pores of the foam carrier before the adhesive has set.

2. A process as set forth in claim 1 using first adsorber particles which are of a particle size of between 0.1 times and 0.9 times the mean pore diameter of the pores of the foam carrier, and using secod adsorer particles which are of powder form.

3. A process as set forth in claim 1 which further comprises providing said foam carrier with the adhesive by impregnation therewithin, squeezing out the impregnated foam carrier, then introducing the first adsorber particles into the pores of the foam carrier, and introducing said secondadsorber articles into the pores of said foam carrier.

4. A process as set forth in claim 1 which further comprises dropping said first and second adsorber particles respectively from a height onto said adhesive-bearing foam carrier.

5. A process as set forth in claim 1 which further comprises oppositely electrostatically charging said first and second adsorber particles on the one hand and said foam carrier on the other hand during the operation of introducing the adsorber particles thereto.

6. A process as set forth in claim 1 which further comprises applying a reduced pressure to a side of said foam carrier which is in opposite relationship to a source of said adsorber particle, during the operation of introducing said first and second particles into said foam carrier.

7. A process as set forth in claim 1 which further comprises processing said foam carrier with said first and second adsorber particles fixed thereto by means of said adhesive to remove adhesive material still clinging thereto, and then returning excessive first and second adsorber particles which are not fixed to said foam carrier to the respective sources of adsorber particles.

8. A filter material comprising: an open-pore foam carrier; first adsorber particles adhesively secured to the surface of the foam carrier including in the open pores thereof, the size of the first adsorber particles being between 0.1 times and 0.9 times the mean pore diameters of the pores of the foam carrier; and second adsorber particles adhesively secured to the surface of the foam carrier including in the pores thereof, in the regions of aid surface which are between the locations at which said first adsorber particles are adhesively secured to said surface, said second adsorber particles being of substantially smaller particle size than the first adsorber particles.

9. A filter material as set forth in claim 8 wherein said second adsorber particles are in powder form.

10. A filter material as set forth in claim 8 wherein said second adsorber particles are of a diameter of from 0.05 to 1 $\mu$m.

11. A filter material as set forth in claim 8 wherein said first adsorber particles are of a generally spherical configuration with a diameter of from 0.1 to 0.9 mm.

12. A filter material as set forth in claim 11 wherein said first adsorber particles are of a diameter of about 0.4 mm.

13. A filter material as set forth in claim 8 wherein said first adsorber particles comprise activated carbon with an internal surface area of between about 600 and about 1400 $m^2/g$ and said second adsorber praticles comprise a highly active powder carbon with an internal surface of $>1000$ $m^2/g$.

* * * * *

UNITED STATES PATENT AND TRADEMARK OFFICE
CERTIFICATE OF CORRECTION

PATENT NO. :  4,800,190
DATED     :  January 24, 1989
INVENTOR(S) : Klaus Smolik It is certified that error appears in the above-identified patent and that said Letters Patent is hereby corrected as shown below:

Col. 1, line 50, after "pores", change "the" to --then--.

Col. 3, line 27, after "first", change "larer" to --larger--.

Col. 4, line 8, after "adsorber", change "praticals" to --particles--.

Col. 5, line 48, after "means.", change "the" to --The--.

Col. 8, line 50, after "surface", insert --area--.

Signed and Sealed this

Twenty-seventh Day of March, 1990

Attest:

JEFFREY M. SAMUELS

Attesting Officer     Acting Commissioner of Patents and Trademarks